United States Patent
Slattery

(10) Patent No.: US 7,881,990 B2
(45) Date of Patent: Feb. 1, 2011

(54) AUTOMATIC TIME TRACKING BASED ON USER INTERFACE EVENTS

(75) Inventor: James A. Slattery, McKinney, TX (US)

(73) Assignee: Intuit Inc., Mountain View, CA (US)

( * ) Notice: Subject to any disclaimer, the term of this patent is extended or adjusted under 35 U.S.C. 154(b) by 721 days.

(21) Appl. No.: 11/565,367

(22) Filed: Nov. 30, 2006

(65) Prior Publication Data

US 2008/0133287 A1 Jun. 5, 2008

(51) Int. Cl.
*G06F 15/02* (2006.01)
*G07C 1/10* (2006.01)

(52) U.S. Cl. .............................. 705/32; 705/9; 235/377; 714/39

(58) Field of Classification Search ........................ None
See application file for complete search history.

(56) References Cited

U.S. PATENT DOCUMENTS

| | | | |
|---|---|---|---|
| 4,905,163 A | 2/1990 | Garber et al. | |
| 4,964,077 A | 10/1990 | Eisen et al. | |
| 5,239,617 A | 8/1993 | Gardner et al. | |
| 5,485,544 A | 1/1996 | Nonaka et al. | |
| 5,825,883 A * | 10/1998 | Archibald et al. | 705/53 |
| 6,233,570 B1 | 5/2001 | Horvitz et al. | |
| 6,262,730 B1 | 7/2001 | Horvitz et al. | |
| 6,289,317 B1 | 9/2001 | Peterson | |
| 6,300,950 B1 | 10/2001 | Clark et al. | |
| 6,625,267 B1 | 9/2003 | Graham et al. | |
| 7,171,365 B2 * | 1/2007 | Cooper et al. | 704/275 |
| 7,194,685 B2 | 3/2007 | Morrison | |
| 7,274,375 B1 * | 9/2007 | David | 345/619 |
| 7,436,816 B2 * | 10/2008 | Mehta et al. | 370/352 |
| 2002/0015056 A1 | 2/2002 | WeinLaender | |
| 2003/0225989 A1 * | 12/2003 | Licalsi | 711/167 |
| 2004/0210470 A1 * | 10/2004 | Rusk | 705/9 |
| 2005/0054381 A1 | 3/2005 | Lee et al. | |
| 2005/0066236 A1 | 3/2005 | Goeller et al. | |
| 2005/0118996 A1 | 6/2005 | Lee et al. | |
| 2005/0187839 A1 * | 8/2005 | Butera et al. | 705/32 |
| 2006/0184410 A1 | 8/2006 | Ramamurthy et al. | |
| 2006/0277544 A1 * | 12/2006 | Bjoernsen et al. | 718/100 |
| 2007/0011234 A1 * | 1/2007 | Albrecht | 709/204 |
| 2007/0043605 A1 * | 2/2007 | Fisher et al. | 705/9 |

(Continued)

OTHER PUBLICATIONS (Time & billing: counting time still counts: what's more important than software that helps you figure out what you're owed? ) by Knaster, Barry and Needleman, Ted; dated Nov. 25, 2002.*

(Continued)

*Primary Examiner*—F. Zeender
*Assistant Examiner*—Luna Champagne
(74) *Attorney, Agent, or Firm*—Osha • Liang LLP

(57) ABSTRACT

In various embodiments, an application may automatically track the amount of time a user spends performing activities on one or more computer applications. The tracked time may be used, for example, to bill a client for the activities performed. To automatically track time for a user, a time tracking application may monitor a user's activities and store time tracking entries with the types of activities performed and the time spent performing the activities. These activity types may be correlated against billing codes.

28 Claims, 14 Drawing Sheets

U.S. PATENT DOCUMENTS

2007/0050719 A1  3/2007  Lui et al.
2007/0300174 A1  12/2007  Macbeth et al.

OTHER PUBLICATIONS

U.S. Appl. No. 10/751,194, filed Dec. 31, 2003.
U.S. Appl. No. 11/741,615, filed Apr. 27, 2007.
U.S. Appl. No. 11/669,525, filed Jan. 31, 2007.
"Timetag: The New Standard in Time Tracking" 2004, Timetag, Inc. pp. 1-2.
"Elite Professional Time and Expense Entry Solutions" http://www.thomsonelite.com/solutions, 2004, pp. 1-4.
"QuickBooks Time Tracker", Intuit, Inc., pp. 1-2.
"QuickBooks Time Tracker" Whitepaper, 2006 Intuit, Inc., pp. 1-2.
Tealeaf Press Release, "Tealeaf CX Implemented by Website of the Nation's Largest Retailer", Nov. 6, 2006, Tealeaf Technology, pp. 1-2.
"Winspector—Ultimate Windows Message Spy".

* cited by examiner

Time Tracking Entries

| User ID (351) | Activity Identifier (325) | Client (353) | Time Indicator (329) | Billing Code (349) |
|---|---|---|---|---|
| User A | Open File | Client A | 9:30 AM | 15 |
| User A | WPA | Client A | 15 minutes | 51 |
| User A | Close File | Client A | 11:30 AM | 16 |
| User B | Print file | Client B | 10 minutes | 28 |
| User A | Review File | Client A | 2 hours | 108 |
| User A | Inactive | Client A | 15 minutes | - |
| User A | Review File | Client A | 1 hour 45 minutes | 108 |

*FIG. 3*

| Client Billable Activities 451 | User Application Activity 103 | Companion User Application Activity 455 | Billing Code 349 |
|---|---|---|---|
| Client Billable Activity 1 | User Application Activity 1 | User Application Activity 2 | 21 |
| Client Billable Activity 2 | User Application Activity 3 | | 79 |
| Client Billable Activity 3 | User Application Activity 4 | User Application Activity 5 | 48 |
| Client Billable Activity 4 | User Application Activity 6 | User Application Activity 7 | 35 |
| Print Tax Return 461 | Select "Print File" 463 | | 71 |

| Client Billable Activities | User Application Activity | Companion User Application Activity | Billing Code |
|---|---|---|---|
| Review File | Select "Open File" | Select "Close File" | 21 |
| Data Entry | Select "Forms" tab | Select "Close Panel" | 79 |
| Research tax laws | Select "Help me" icon | Click "X" on help panel | 48 |
| Efile Return | Select "Efile" icon | | 35 |
| Print Tax Return | Select "Print File" icon or "Print File" from Print menu | | 71 |

*FIG. 9a*

Time Tracking Entries

| User ID | Activity Identifier | Client | Time Indicator | Billing Code |
|---|---|---|---|---|
| Tax Accountant A | Review File | Client X | 1.8 hours | 15 |
| Tax Accountant A | Data Entry | Client X | 45 minutes | 13 |
| Tax Accountant A | Research Tax Laws | Client X | 11:30 AM-11:45 AM | 16 |
| Tax Accountant A | Inactive | Client X | 15 minutes | - |
| Tax Accountant A | Print Tax Return | Client X | 10 minutes | 28 |
| Tax Accountant A | Efile Return | Client X | 11:45 AM – 11:50 AM | 16 |

*FIG. 9b*

Time Tracking Entries

| User ID (351) | Activity Identifier (325) | Client (353) | Time Indicator (329) | Billing Code (349) |
|---|---|---|---|---|
| John D. | Review File | Client X | 1.5 hours | 15 |
| John D. | Data Entry | Client X | .6 hours | 13 |
| John D. | Research Tax Laws | Client X | .3 hours | 16 |
| John D. | Print Tax Return | Client X | .2 hours | 28 |
| John D. | Efile Return | Client X | .1 hours | 16 |

*FIG. 9d*

Invoice (999)

| Billing Code | Tax Accountant | Activity | Time | Rate | Total |
|---|---|---|---|---|---|
| 15 | John D. | Review File | 1.5 hours | $150/hr | $225 |
| 13 | John D. | Data Entry | .6 hours | $150/hr | $90 |
| 16 | John D. | Research Tax Laws | .3 hours | $150/hr | $45 |
| 28 | John D. | Print Tax Return | .2 hours | $150/hr | $30 |
| 16 | John D. | Efile Return | .1 hours | $150/hr | $15 |
| | | | | Total: | $405 |

*FIG. 9e*

AUTOMATIC TIME TRACKING BASED ON USER INTERFACE EVENTS

BACKGROUND

Different professionals and other individuals may need to keep track of the time they spend working on various matters. For example, when professionals bill clients, it is often helpful for the professional to show the client a breakdown of the time spent working on their matters to help the client see the source of particular charges. Professionals may track time manually on paper time sheets or may use manual time tracking software. Manual time tracking software may require individuals to manually open timesheets and manually enter time and/or start and stop a timer. The individual may also need to manually insert information about each matter (e.g., client name, file name, notes, etc.) into the time tracking software.

Manually entering information and keeping track of time can lead to several problems. For example, individuals may forget to start timers and/or enter start/stop times while the individual is working on a particular matter. This may result in the individual having to estimate time spent on different matters at a later date. Manual timesheets may also have various inaccuracies (e.g., the individual may inadvertently enter the wrong identification for a client).

SUMMARY

In various embodiments, a time tracking application may automatically track the amount of time a user spends performing activities on one or more user applications. For example, time may be automatically tracked for client billable activities. The tracked time may be used, for example, to bill a client for the activities performed. To automatically track time for a user, the time tracking application may monitor a user's activities and store time tracking entries with corresponding activity indicators and time indicators that indicate the amount of time spent performing the corresponding activities.

In some embodiments, the time tracking application may monitor a user's activities by monitoring user application activities (e.g., activities performed by a user to interact with the user application). These activities may include, for example, selecting specific menu options or clicking on an icon using a computer mouse cursor. In some embodiments, the time tracking application may monitor these activities by intercepting messages between an operating system and the user application.

In some embodiments, the time tracking application may determine if a detected user application activity corresponds to a client billable activity. For example, the time tracking application may access a look-up table with user application activities and corresponding client billable activities. In some embodiments, for user application activities that have a corresponding client billable activity, the time tracking application may store a time tracking entry with the activity identifier and a time indicator for the activity. The activity identifier may correspond to the user application activity and/or the client billable activity. The activity identifier may be, for example, a descriptor or a numerical indicator related to an activity through a look-up table. The time indicator may be a start time/stop time and/or a duration. In some embodiments, the time tracking application may store time tracking entries for a user application activity even if the user application activity does not correspond to a client billable activity.

In some embodiments, time indicators may be determined by calculating the amount of time between user application activities and their companion user application activities. In some embodiments, some user application activities may not have a companion user application activity, and a time indicator may be calculated as, for example, a known or reported duration of the user application activity. In some embodiments, a time indicator may be adjusted to compensate for user inactivity. Inactivity may be determined, for example, by monitoring time that peripheral devices coupled to a computer system with the user application are not being used. In some embodiments, the user may indicate a threshold time value such that the time tracking application should not consider inactivity time that is less than the threshold time value. In some embodiments, the user may click an icon or press a hot key to suspend the applications determination of an inactivity time.

Time tracking entries may be stored with additional information. For example, a client identifier, a user identifier, and a billing code may be stored with time tracking entries. This information may be provided by the user, accessed from a database, or accessed from, for example, a file the user is working on. In some embodiments, the time tracking application may display time tracking entries to the user for review. The user may review and/or modify the entries and the entries may be organized for a client invoice. Invoices may be prepared using the reviewed time tracking entries and then sent to the client.

BRIEF DESCRIPTION OF THE DRAWINGS

A better understanding of the present invention may be obtained when the following detailed description is considered in conjunction with the following drawings.

FIG. 3 illustrates time tracking entries, according to an embodiment.

FIGS. 4a-b illustrate a method and corresponding look-up table for defining billable activities for time tracking entries, according to an embodiment.

FIGS. 9a-e illustrate an embodiment of the time tracking application being used to collect data for a client invoice.

Figure 1:
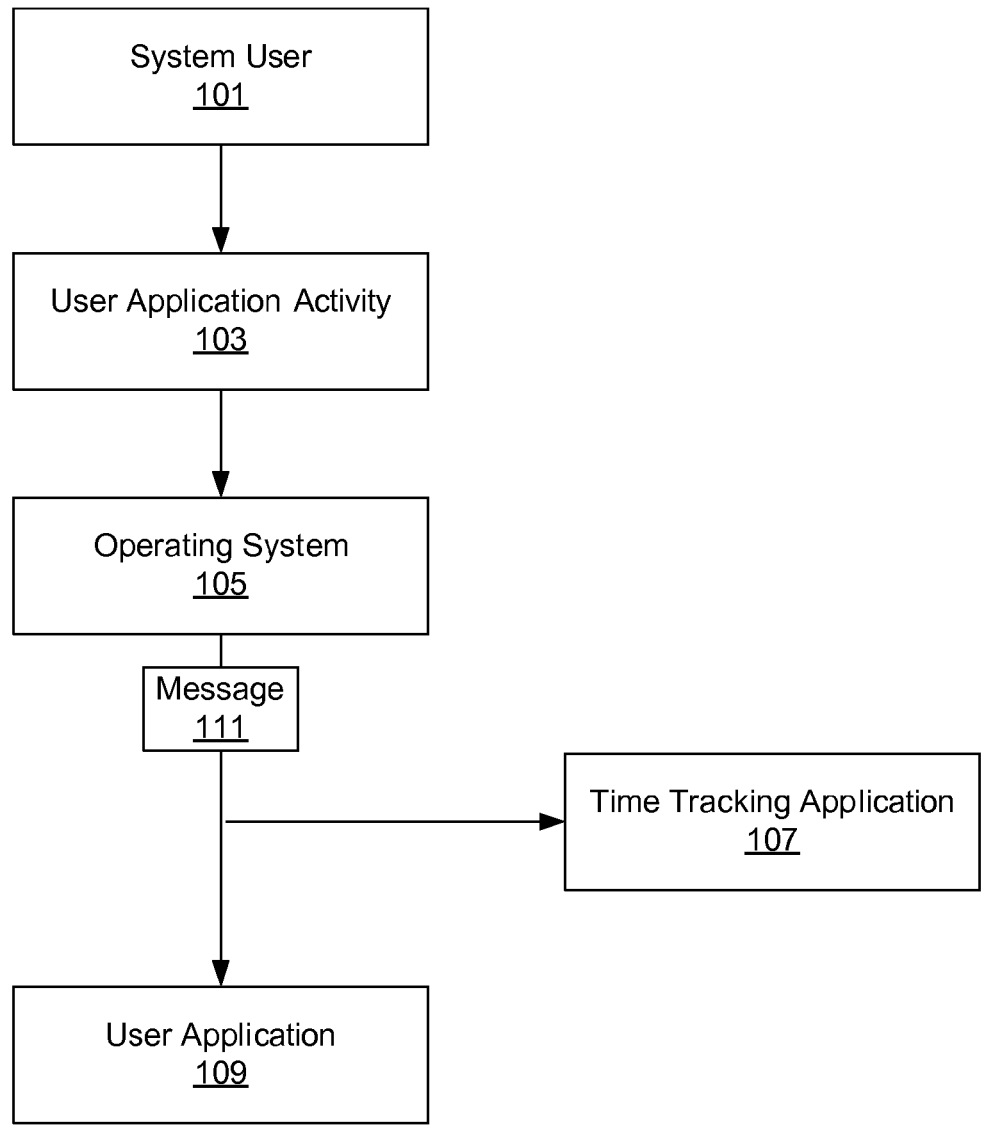
FIG. 1 illustrates data flow between an operating system on a computer system and a time tracking application, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF EMBODIMENTS

In various embodiments, a time tracking application may automatically track the amount of time a user spends performing activities using one or more user applications (e.g., computer system applications). The tracked time may then be used, for example, to prepare invoices for a client for the activities performed. To automatically track time for a user, a time tracking application may monitor a user's activities with the user application and store time tracking entries with the types of activities performed by the user and the time spent performing the activities. These activity types may be correlated against billing codes to assist in preparing billing invoices to send to the client. For example, tax return preparers may use a tax preparation application to open a tax return, enter data into to the tax return, print the tax return, and efile the tax return. The time spent by the tax return preparer at the different stages of preparing the tax return may be monitored and stored automatically to facilitate bill preparation for the tax return client. The time tracking application may be used to monitor and store time for other application types and users (e.g., storing time entries for an attorney using a word processor application to prepare court documents).

FIG. 1 illustrates data flow between an operating system 105 on a computer system and a time tracking application 107, according to an embodiment. In some embodiments, activity types may be determined by monitoring user application activities 103. User application activities 103 may include activities by a system user 101 to interact with a user application 109. User application activities 103 may include various system user actions (e.g., interactions between the user and a user interface on a computer screen). Interactions may include selecting a menu option or clicking an icon using a mouse cursor.

Figure 2:
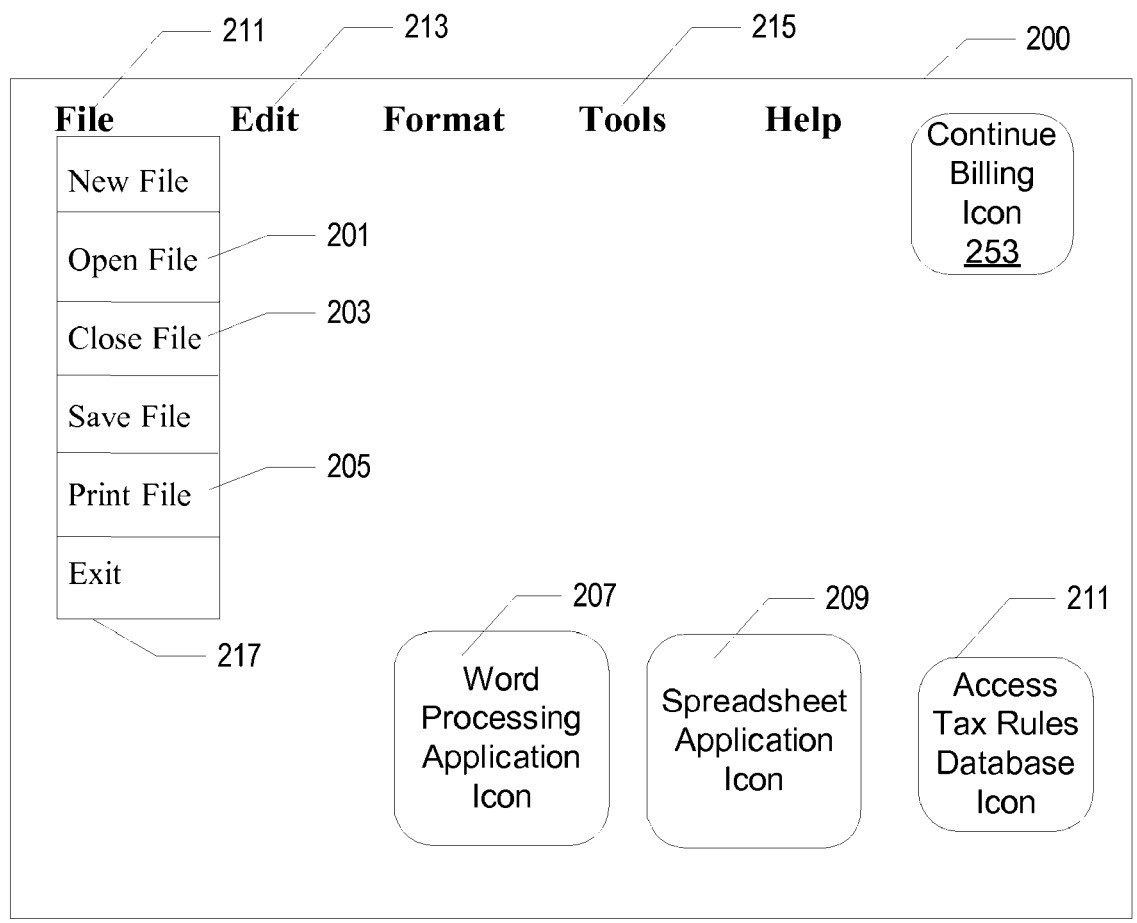
FIG. 2 illustrates various menu options and icons, according to an embodiment.

As seen in FIG. 2, menu options may include, for example, menus accessed by clicking "File" 211, "Edit" 213, or "Tools" 215 on computer screen 200. Menu options may further include options from drop down menus, pop-up menus, etc. For example, clicking "File" 211 may result in displaying drop down menu 217 with options such as "Open File" 201, "Close File" 203, and "Print File" 205. Other options are also contemplated. Icons may include, for example, word processing application icon 207, spreadsheet application icon 209, and access tax rules database icon 211. Other user application activities 103 by system users 101 are also contemplated. User application activities 103 may include any activity by a system user 101 detectable by the computer system (including activities with peripheral devices coupled to the computer system). In addition, user application activities 103 may include an absence of activity (e.g., a user application activity 103 may include not detecting an activity (e.g., not detecting typing on a keyboard)).

In various embodiments, system users 101 may include human users, machines, or computer systems. The computer system may interpret user application activities 103 to determine a user's intent for various application actions including opening a file, closing a file, inputting data into a data panel, or printing a file. For example, a user application activity 103 of selecting an "Open File" 201 menu option from a drop down menu (e.g., by clicking on the "Open File" menu option using a mouse cursor) may indicate to a user application 109 on a computer system that the user wants to open a file. Actions indicated by user application activities 103 may include any actions that are performable by the user application 109 or application linked to the user application 109. For example, actions may include accessing a database on a network, sending an electronic correspondence, or accessing a help menu. As another example, the user application activity 103 of selecting the word processing application icon 207 or the spreadsheet application icon 209 may open another application for use by the user.

In some embodiments, the user application activity 103 from the system user 101 may be detected by the operating system 105. For example, the operating system 105 may detect an input from the system user 101 on an attached peripheral device. The operating system 105 may send a message 111 to the user application 109 with information about the user application activity 103. For example, if the operating system 105 detects a mouse click when an on screen cursor has been moved over the "Open File" 201 menu option of the application's "File" menu, the operating system 105 may send a message 111 to the user application 109 with information indicating the system user 101 has selected the "Open File" 201 menu option from the application's interface.

In some embodiments, the message 111 sent to the user application 109 may also be received by a time tracking application 107. In some embodiments, the time tracking application 107 may intercept the message 111, read the message 111, and then send the message 111 to the user application 109. In some embodiments, the time tracking application 107 may receive a separate copy of the message 111 from the operating system 105. The time tracking application 107 may also receive the message 111 (or a similar message 111) from the user application 109. In some embodiments, the time tracking application 107 may be part of the user application 109 and may receive the message 111 through the user application 109.

In some embodiments, the time tracking application 107 may store a data structure (e.g., a time tracking entry) with information about the user application activities 103 (e.g., as determined from the messages 111) in a database. For example, the time tracking application 107 may store an activity identifier 325 along with a time indicator 329 that may indicate an amount of time or may be used to determine the amount of time the system user 101 spends between and/or on user application activities 103. For example, time indicators 329 may indicate the time between when the user clicks on an "Open File" 201 menu option and when a user clicks on a "Close File" 203 menu option. Time indicators 329 may include, for example, a start time, a stop time, or a total time. Other time indicators 329 are also contemplated. Time indicators 329 may indicate (or be used to determine) a specific time or a time duration. For example, the time indicator 329 may include a total time (e.g., as determined by a timer) or may include a start time and stop time (which can be used to determine a total time). The time indicators 329 may be stored in time tracking entries in association with the activity identifier 325 that may identify the activity or type of user application activity 103 associated with the time indicator 329.

FIG. 3 illustrates time tracking entries, according to an embodiment. The time tracking application 107 may create and store data structures in the form of time tracking entries corresponding to user application activities 103 and/or corresponding client billable activities. The time tracking entries may, for example, store activity identifiers 325 as determined by the time tracking application 107 from analyzing the user application activities 103. For example, the time tracking application 107 may create time tracking entry 301 upon receiving a message 111 that indicates a system user 101 has clicked on a region of the computer screen associated with selecting the "Open File" 201 menu option. The time tracking application 107 may store an activity identifier 309 (e.g., "Open File") that may correspond to a user application activity 103 and/or an associated client billable activity. For example, the activity identifier 309 may be a technical description of the user application activity 103 (e.g., "click at 173,12") or may include a summary description (e.g., "Open File"). The activity identifier 309 may describe a client billable activity (e.g., "Review File"). Other activity identifiers may also be used to identify the user application activity 103 and/or client billable activity. In some embodiments, activity identifiers 325 may be numerical (e.g., a number that corresponds to an activity, for example, through a look-up table) or textual (e.g., "Open File"). Other activity identifier types are also contemplated.

In some embodiments, activity identifiers 325 may also be stored to identify inactivity. For example, the time tracking application 107 may monitor peripheral device usage (e.g., through messages 111 received/intercepted from the operating system 105) and store time tracking entries for periods of time that no user activity is detected (e.g., time between keyboard and/or mouse access). In some embodiments, a time tracking entry may be created for time periods of inactivity that exceed a predetermined (e.g., user defined or default) threshold of time. In some embodiments, a continue billing icon 253 may be displayed on the computer screen that the user can click on to signal the time tracking application 107 to continue considering future time as active time. For example, if the system user 101 needs to analyze a document and will not be typing on a keyboard but wants the time tracking application 107 to continue considering the time spent away from the keyboard as active time, the system user 101 may click on the on-screen icon 253. In some embodiments, the system user 101 may click on the icon 253 a second time to return to normal time tracking. Other icon types are also contemplated. In some embodiments, the user may press a predefined hot key instead of clicking on an icon. Instead of clicking the icon or pressing the hot key a second time to resume normal time tracking, the time tracking application 107 may resume normal time tracking after a predetermined time limit (which may also be user defined). Other ways of starting and stopping time tracking are also possible (e.g., tapping a touchscreen or moving a mouse pointer to a certain portion of the computer screen).

In various embodiments, time indicators may indicate time durations and/or start/stop times. For example, the time tracking application 107 may store the start time "9:30 AM" 313. The start time 313 may represent the time that the "Open File" 201 menu option was selected or a time when the time tracking entry 301 for the "Open File" menu option selection was created. Stop times may be similarly stored for user application activities 103. For example, stop time "11:30 AM" 333 may be stored in time tracking entry 303 for the activity identifier "Close File". Time indicators 329 may also indicate a duration. For example, time tracking entry 305 indicates the system user 101 selected the "Print File" menu option 205 (or in some other way indicated the system user 101 wanted to print a file) for a file and the time indicator 315 indicates it took 10 minutes to print the file. As another example, time tracking entry 325 indicates User A used a word processing application (WPA) for 15 minutes (e.g., the system user 101 may have selected the word processing application icon 207 to access the word processing application through the current user application 109).

In some embodiments, time indicators 329 that indicate a duration may be determined by using timers or by determining time from time indicators 329 of corresponding user application activities 103. For example, instead of creating a time tracking entry 301 for opening a file at 9:30 AM and a time tracking entry 303 for closing the file at 11:30 AM, the time tracking application 107 may 301 start tracking time when the file is opened, track the time until the file is closed, and then store a time tracking entry 307 indicating the file was reviewed for 2 hours. In some embodiments, the time tracking application 107 may store time tracking entry 301 and 303 and then consolidate the two time tracking entries into one time tracking entry 307. In some embodiments, the time indicator 329 may indicate a duration and a start/stop time.

In some embodiments, time tracking entries may account for periods of inactivity. For example, if the time tracking application 107 detects 15 minutes of inactivity (e.g., no peripheral device usage) between an "Open File" selection and a "Close File" selection, the time indicator 335 for "Review File" may be calculated by subtracting 15 minutes from the total time between the "Open File" and "Close File" user application activities 103. In some embodiments, the time tracking application 107 may only subtract the time of inactivity when calculating a time indicator 329 if the time of inactivity exceeds a predetermined threshold (e.g., 10 minutes). The predetermined threshold may be set and/or changed by a system user 101. The predetermined threshold may also be determined from other sources (e.g., from a file stored on an external storage device). In some embodiments, the time of inactivity may not be subtracted, but may be stored in a separate time tracking entry 319 for later access. In some embodiments, the time tracking entry 319 may be consolidated with time tracking entries 301 and 303 into a new time tracking entry 323 with a time indicator 329 indicating the duration between time tracking entries 301 and 303 minus the duration of the inactivity stored in time tracking entry 319.

In some embodiments, the time tracking application 107 may store other information associated with the user application activity 103 indicated in message 111. In some embodiments, the time tracking application 107 may store a user identification (ID). For example, "User A" 321 in time tracking entry 301. In some embodiments, the time tracking application 107 may store a client identity 353 with the time tracking entries. For example, the time tracking application 107 may determine that the opened file is associated with Client A and may store a client indicator 311 indicating "Client A". In some embodiments, the time tracking application 107 may access information stored in the file the system user 101 opened to determine the identity of the client 353. For example, the time tracking application 107 may read information in a file header or access the text of the file to determine a client identity 353. In some embodiments, the time tracking application 107 may access a database with information about the file. For example, the time tracking application 107 may use a look-up table to find a client identity 353 associated with the name of the file opened. Other ways of determining a client identity 353 are also possible. For example, the time tracking application 107 may open a dialog window to ask the system user 101 for the identity of the client 353. Other user interface options for entering the client identity are also contemplated. User interface options may include, for example, the system user 101 indicating the identity of the client by typing a client ID into a pop-up window or selecting a menu option with the client ID from a user interface menu.

In some embodiments, the time tracking entries may also store billing codes 349 (e.g., billing code 317) associated with user application activities 103 that are billable to a client (client billable activities). The billing codes 349 may be helpful, for example, in summarizing and/or grouping related billing entries on a client bill. In some embodiments, billing codes 349 for client billable activities may be stored in a file accessible by the time tracking application 107. For example, the time tracking application 107 may access the billing codes file to determine that "Review File" is associated with billing code 108. The billing codes 349 may also be associated with specific user application activities 103 or specific client billable activates. For example, selecting "Print File" may be associated with the billing code 28.

In some embodiments, billing codes 349 may be associated with user application activities 103 that are specified as client billable activities. For example, billing codes 349 may be provided for user application activities 103 that correspond to client billable activities. In some embodiments, a system user 101 may not assign a billing code 349 to certain user application activities 103 (e.g., activities that are not billed to the client 353 such as a virus scan). The absence of a billing code 349 may be an indicator to the time tracking application 107 that a particular user application activity 103 is not a client billable activity and therefore the time tracking application 107 may not store a time tracking entry for the particular user application activity 103. Other indicators (e.g., the user clicking a hot key right after a certain user application activity 103) may also be used by the system user 101 to signal the time tracking application 107 to disregard a user application activity 103.

Time tracking entries may take different forms. For example, time tracking entries may include descriptors (e.g., as seen in FIG. 3). As another example, time tracking entries may be entirely or partially numerical with numbers used to represent the user IDs 351, activity identifiers 325, client IDs 353, time indicators 329, and billing codes 349. Various descriptor types may be used. For example, the User ID 351 may be represented as the user's first name, last name, a combination of the first name and last name, a numerical employee code, etc. As another example, the time indicator 329 may be represented as a standard time, military time, number of minutes, number of tenths of an hour, etc. Time tracking entries may be placed together or placed on separate data sheets (e.g., one data panel per time entry). Other time tracking entry arrangements are also possible.

In some embodiments, time tracking entries may be displayed to the system user 101 to be verified and/or modified. For example, the system user 101 modify a time tracking entry by subtracting time from a time indicator 329 for an activity that the system user 101 spent less time than indicated by the time indicator for that time tracking entry. The system user 101 may also add time to a time indicator 329 (e.g., to compensate for research time that the time tracking application 107 determined was inactive time). Other modifications are also possible. The time tracking entries may then be organized (e.g., by client 353, by billing code 349, etc.) and placed on an invoice to send to the client 353. The invoice may be reviewed by the system user 101, printed, and sent to the client 353 (an electronic copy of the invoice may be sent in addition to or in place of the printed version).

Figure 4A:
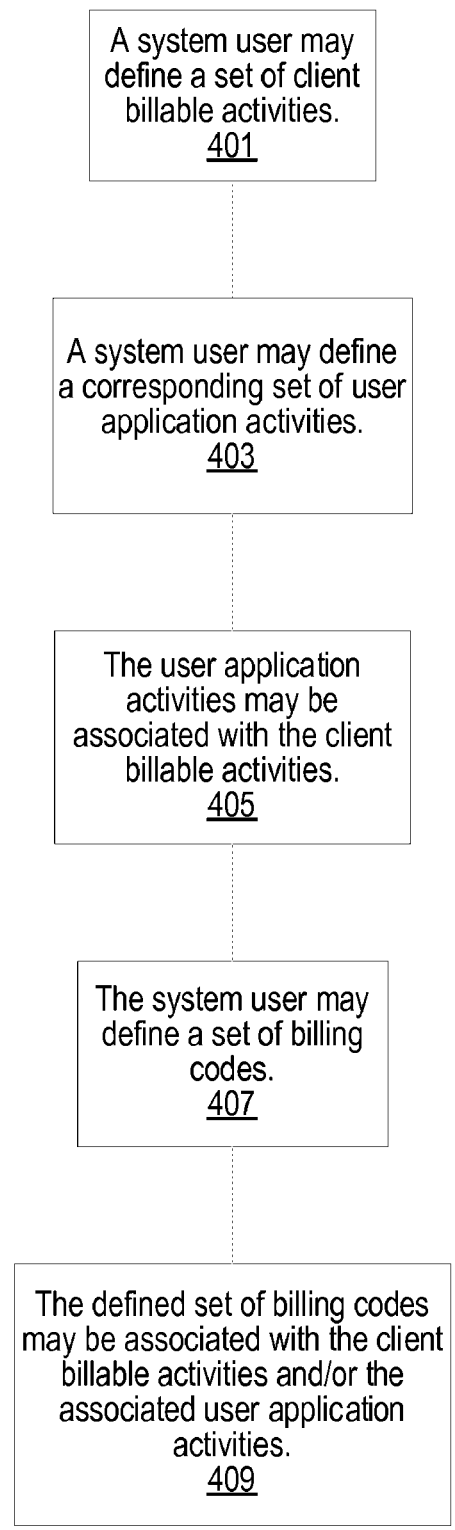

FIGS. 4a-b illustrate a method and corresponding look-up table for defining billable activities for time tracking entries, according to an embodiment. It should be noted that in various embodiments of the methods described below, one or more of the elements described may be performed concurrently, in a different order than shown, or may be omitted entirely. Other additional elements may also be performed as desired. In some embodiments, the method may be performed automatically (e.g., by a computer system).

At 401, a system user 101 may define a set of client billable activities 451. Client billable activities 451 may include activities that can be billed to a client 353 (e.g., preparing a file, reviewing the file, printing the file, efiling the file, etc.).

At 403, a system user 101 may define a corresponding set of user application activities 103. The system user 101 may define which user application activities 103 indicate the beginning/end of a client billable activity 451. For example, the user application activities of selecting "Open File" and "Close File" may respectively indicate the beginning and end of reviewing a file (a client billable activity 451). The user application activity 103 ending the client billable activity may be referred to as a companion user application activity 455.

At 405, the user application activities 103 may be associated with the client billable activities 451. For example, the system user 101 may associate the client billable activities 451 with their corresponding user application activities 103 in a look-up table 459 in a file accessible to the time tracking application 107. The time tracking application 107 may present a user interface to the system user 101 to allow the system user 101 to define the associations. Other sources of association are also contemplated. For example, the time tracking application 107 may import the file with the associations from a storage device on a network.

At 407, the system user 101 may define a set of billing codes 349.

At 409, the defined set of billing codes 349 may be associated with the client billable activities 451 and/or the associated user application activities 103. The billing codes 349 may be used to organize the client billable activities 451 and/or user application activities on an invoice to a client 353. For example, they may be used to group certain types of client billable activities 451 to determine a total amount of time spent performing certain types of activities (e.g., printing tax returns). Billing codes 349 may also be used for uniformity in the billing process.

Figure 5:
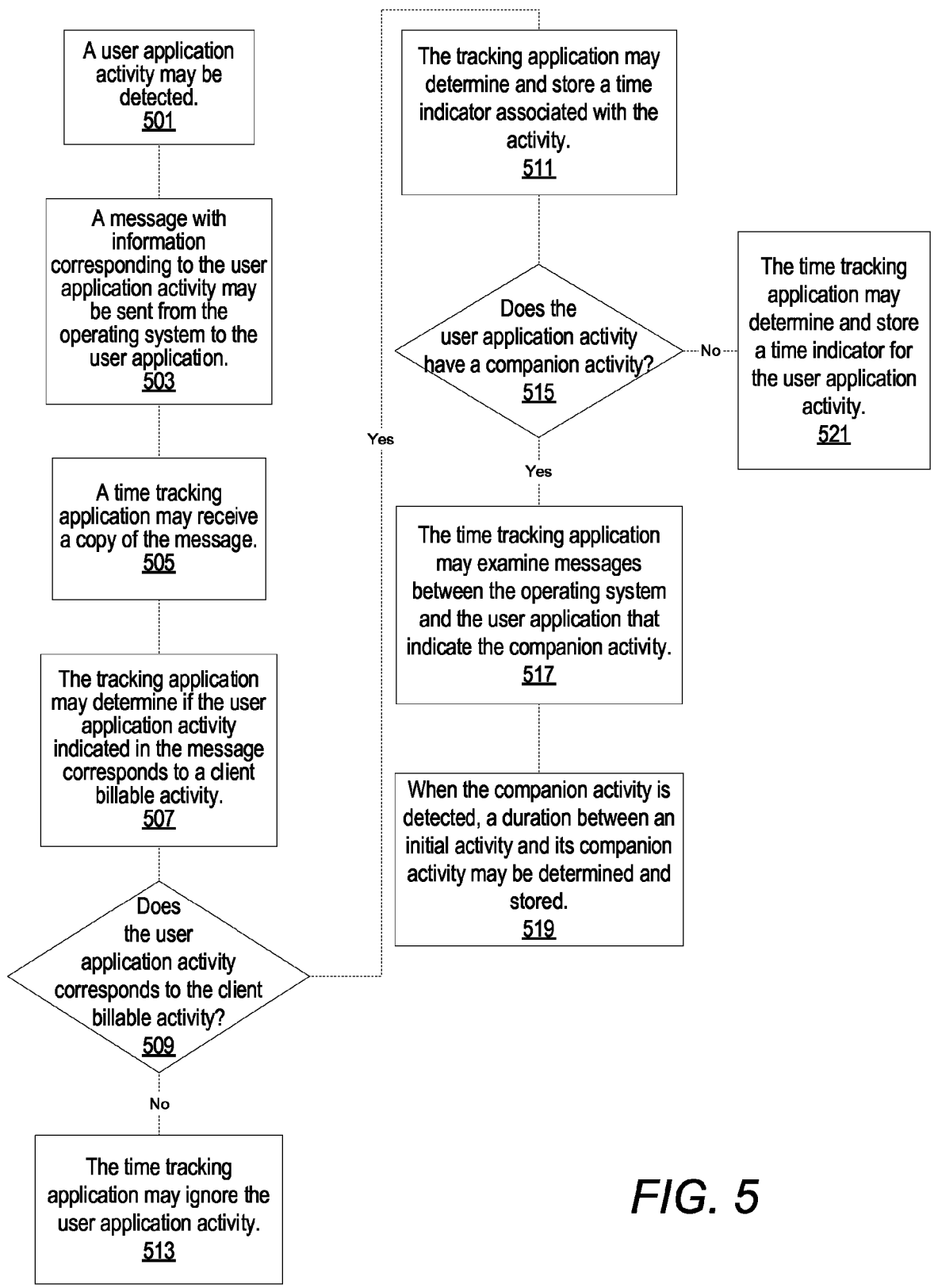
FIG. 5 illustrates a method for detecting user application activities for time tracking entries, according to an embodiment.

FIG. 5 illustrates a method for detecting user application activities 103 for time tracking entries, according to an embodiment. It should be noted that in various embodiments of the methods described below, one or more of the elements described may be performed concurrently, in a different order than shown, or may be omitted entirely. Other additional elements may also be performed as desired. In some embodiments, the method may be performed automatically (e.g., by a computer system).

At 501, a user application activity 103 may be detected (e.g., by an operating system 105 on a computer system used by a system user 101). The operating system 105 may detect signals from peripheral devices (e.g., keyboards, computer mouses, touchscreens, etc.) that indicate interactions between the system user 101 and, for example, a user interface presented to the system user 101. The user interface may be displayed on a computer screen and may be controlled by the user application 109. Other types of user application activities 103 are also contemplated. For example, the system user 101 may give a voice command detectable by a microphone coupled to a computer system. The detected user application activity 103 may correspond to a client billable activity 451. The client billable activities 451 may be specified in a predefined set of client billable activities 451 (e.g., a set of client billable activities 451 and associated billing codes 349 predefined by the system user 101). In some embodiments, user application activities 103 not associated with a client billable activity 451 may be disregarded.

At 503, a message 111 with information corresponding to the user application activity 103 may be sent from the operating system 105 to the user application 109. The message 111 may include keystrokes, a mouse cursor location on screen a mouse cursor click, a touchscreen touch detection coordinates, etc. The message 111 may include information to be used by the application to determine how the system user 101 is trying to interact with the application's user interface.

At 505, a time tracking application 107 may receive a copy of the message 111. For example, the time tracking application 107 may receive the message 111 from the operating system 105 before the message 111 is sent to the user application, or the time tracking application 107 may intercept a copy of the message 111 sent to the user application.

At 507, the time tracking application 107 may determine if the user application activity 103 indicated in the message 111 corresponds to a client billable activity 451. For example, the time tracking application 107 may access a look-up table 459 in a file (e.g., as seen in FIG. 4b). Other methods of determining if the user application activity is associated with a client billable activity 451 are also possible.

At 509, if the user application activity 103 corresponds to the client billable activity 451, at 511, the time tracking application 107 may determine and store a time indicator 329 associated with the activity. For example, if the user application activity 103 is "Print File" indicating a user selected "Print File" from a drop down menu, the time tracking application 107 may access the look-up table 459, locate "Print File" 463 in the User Application Activity column and determine that this user application activity 103 is associated with the client billable activity "Print Tax Return" 461 which is aligned with it in the next column. Other file formats are also possible. The time tracking application 107 may determine and store a respective time indicator 329 (e.g., the time taken to print the file).

At 513, if the user application activity 103 does not correspond to a client billable activity 451, the time tracking application 107 may disregard the user application activity 103. For example, if the time tracking application 107 does not find the user application activity 103 on the look-up table 459, it may disregard the user application activity. In some embodiments, the user application activity 103 may be included in look-up table 459 and designated as a user application activity 103 to disregard.

At 515, the time tracking application 107 may determine if the user application activity 103 has a companion user application activity 455 (a user application activity 103 indicating an end to a client billable activity 45 1). For example, an "Open File" user application activity 103 may have a companion "Close File" user application activity 103 or another user application activity 103 that indicates the file was closed (e.g., an "Exit" user application activity 103 that results in a closed file when the application closes).

At 517, if the user application activity 103 has a companion user application activity 455, the time tracking application 107 may examine messages 111 between the operating system 105 and the user application 109 to determine if/when a message 111 corresponding to the companion user application activity 455 arrives. For example, if a user application activity 103 of "Open File" is initially indicated by a message 111, the time tracking application 107 may examine future messages 111 looking for the companion user application activity 455 of selecting "Close File".

At 519, when the companion user application activity 455 is detected, a duration between an initial user application activity and its companion user application activity 455 may be determined and stored as a time indicator 329. For example, a timer may be started when the initial user application activity occurs and the timer may be accessed for a total time when indication of the companion user application activity 455 is received in a message 111. As another example, a start time may be stored for the initial user application activity and a stop time may be stored for the companion user application activity 455. The time between the start time and stop time may be stored as a time indicator 329 for the client billable activity 451 associated with the user application activity 103 and companion user application activity 455.

At 521, if the user application activity 103 does not have a companion user application activity 455, the time tracking application 107 may determine and store a time indicator 329 for the user application activity 103. For example, the user application activity 103 of select "Print File" 463 may not have a companion user application activity 455 and, therefore, the time indicator 329 stored for the "Print File" user application activity may be set equal to a total time used by the printer to print the file (instead of waiting for a companion user application activity 455).

Figure 6A:
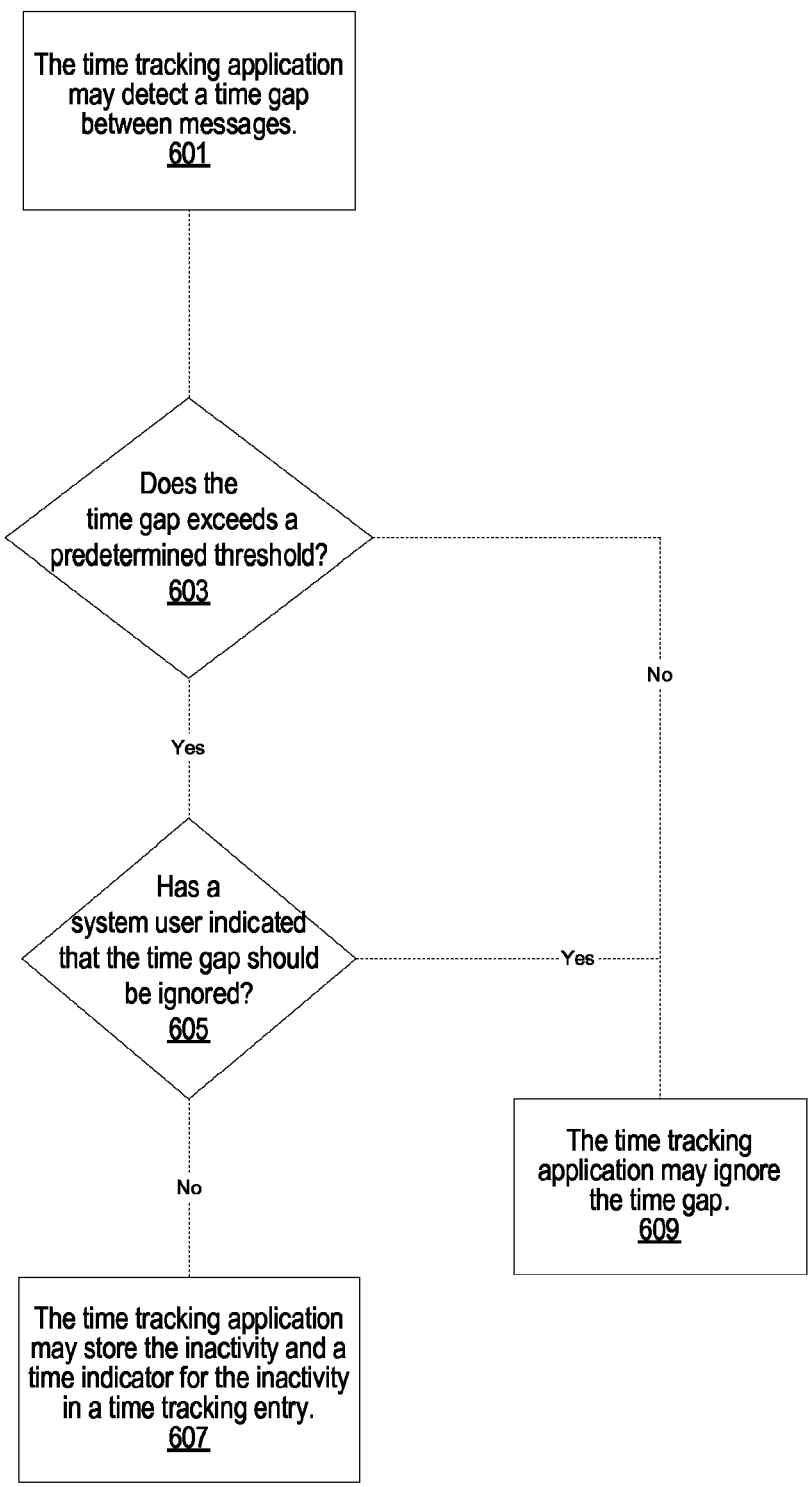
FIGS. 6a-b illustrates a method for detecting inactivity for a time tracking application, according to an embodiment.
Figure 6B:
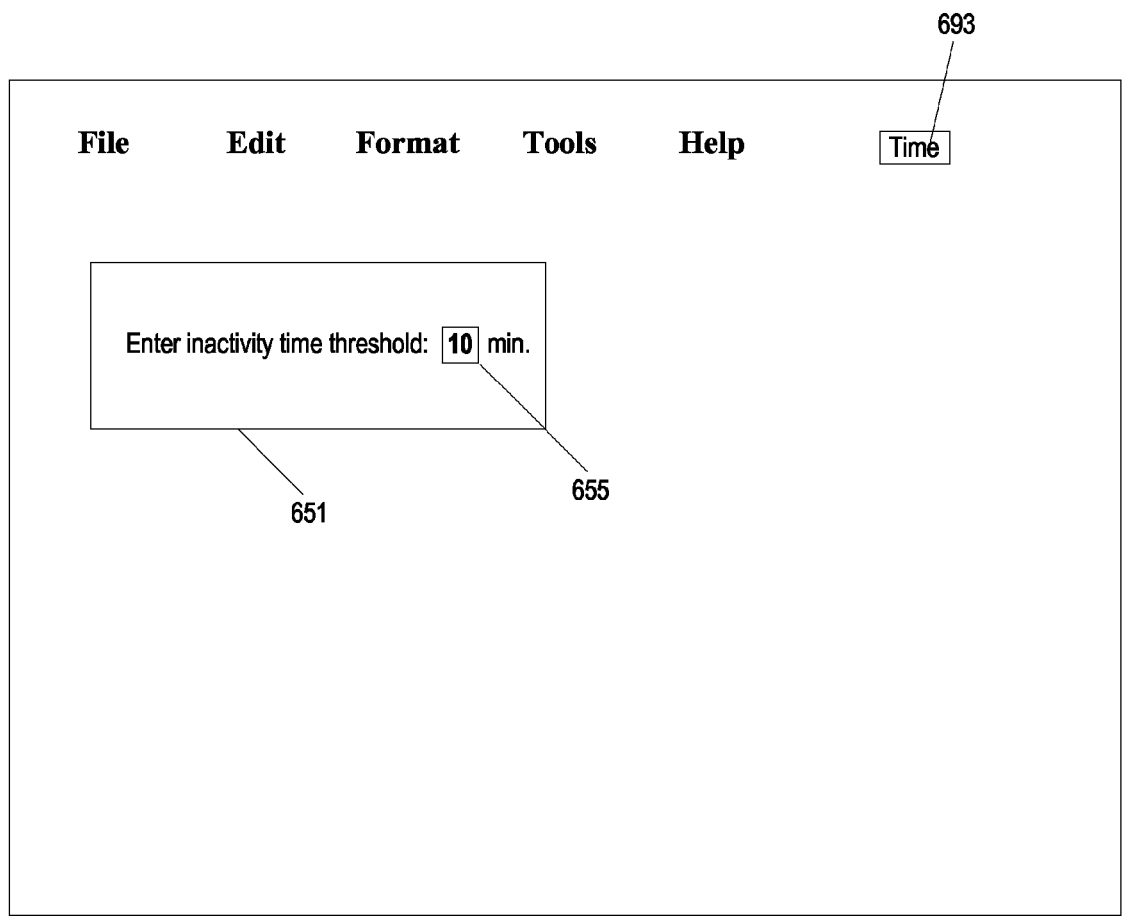

FIGS. 6a-b illustrates a method for detecting inactivity for a time tracking application 107, according to an embodiment. It should be noted that in various embodiments of the methods described below, one or more of the elements described may be performed concurrently, in a different order than shown, or may be omitted entirely. Other additional elements may also be performed as desired. In some embodiments, the method may be performed automatically (e.g., by a computer system).

At 601, the time tracking application 107 may detect a time gap between messages 111. Messages 111 may, for example, indicate the system user 101 is typing on a keyboard and a time gap between messages 111 may indicate that the system user 101 has stopped typing on the keyboard. Time gaps between messages 111 indicating other types of peripheral device usage may also indicate that the system user 101 may be inactive.

At 603, the time tracking application 107 may determine if the time gap exceeds a predetermined threshold. In some embodiments, a system user 101 may provide the time tracking application 107 with a threshold to use in determining inactivity. For example, the system user 101 may enter a time value 655 into a user interface box 651 for the time tracking application 107 to use as a threshold. In some embodiments, the predetermined threshold may be a default value. The threshold and other parameters may be accessed/changed through the user interface 651 or other user interfaces displayed to the system user 101. The user interfaces may be displayed, for example, when the system user 101 clicks on the "Time" icon 693. Other ways of accessing a user interface for the time tracking application 107 are also contemplated.

At 605, if the time gap exceeds the predetermined threshold, the time tracking application 107 may determine if a system user 101 has indicated that the time gap should be disregarded. For example, the time tracking application 107 may determine if the user has selected a continue billing icon 253. As another example, the system user 101 may press a hot key (or hot key combination). A hot key combination (e.g., Alt+s) may be used to suspend detection of time gaps by the time tracking application 107. Another hot key (or hot key combination such as Alt+r) may be used to resume detection of time gaps by the time tracking application 107. In some embodiments, the time tracking application 107 may resume detection of time gaps after a predetermined amount of time (e.g., a default value or a value provided by the system user 101). For example, the time tracking application 107 may resume detecting time gaps 30 minutes after the system user 101 has selected the continue billing icon 253 or hit a hot key to suspend detection of time gaps.

At 607, if the time gap exceeds the predetermined threshold and the system user 101 has not indicted the time gap should be disregarded, the time tracking application 107 may store an activity identifier 325 indicating inactivity and a corresponding time indicator 329 in a time tracking entry. In some embodiments, the time tracking application 107 may subtract the duration of the time gap of inactivity from a duration being calculated for another user application activity 103 and/or client billable activity 451. For example, if the system user 101 has selected "Open File" and a time gap exceeding a predetermined threshold occurs before the system user 101 selects "Close File", the time tracking application 107 may subtract the duration of inactivity from the time indicator 329 assigned to the client billable activity 451 corresponding to the "Open File" and "Close File" user application activities 103.

At 609, if the time gap does not exceed the threshold and/or if the system user 101 indicated the time gap should be disregarded, the time tracking application 107 may disregard the time gap. In some embodiments, the time tracking application 107 may continue to monitor messages 111 to determine if another future time gap should be applied.

Figure 7:
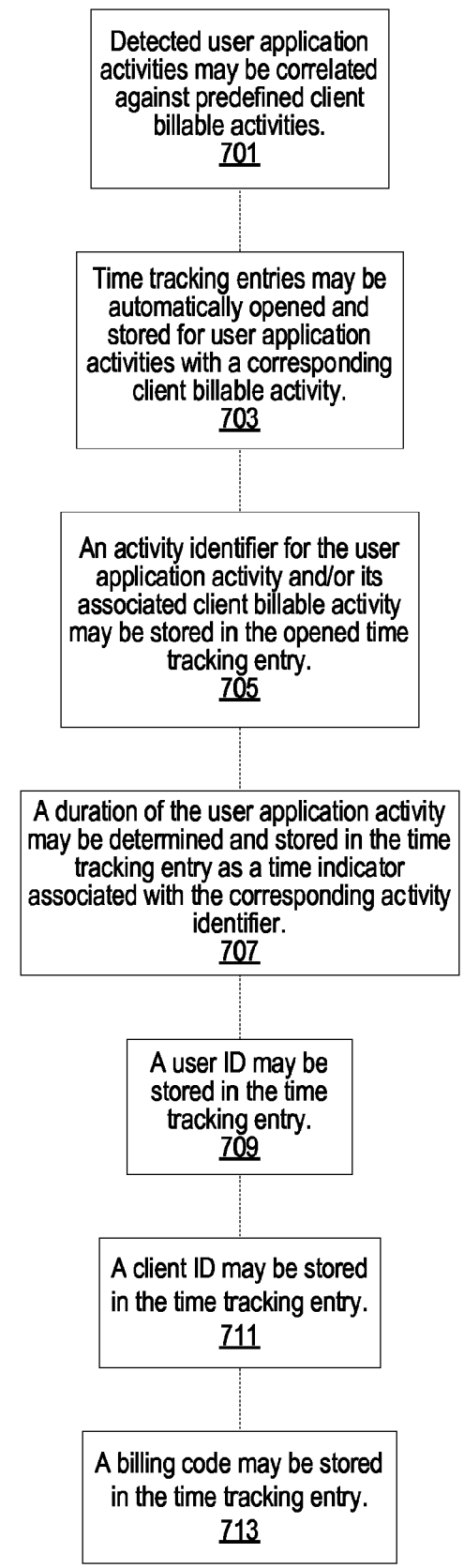
FIG. 7 illustrates a method for storing time tracking entries, according to an embodiment.

FIG. 7 illustrates a method for storing time tracking entries, according to an embodiment. It should be noted that in various embodiments of the methods described below, one or more of the elements described may be performed concurrently, in a different order than shown, or may be omitted entirely. Other additional elements may also be performed as desired. In some embodiments, the method may be performed automatically (e.g., by a computer system).

At 701, detected user application activities 103 may be correlated against predefined client billable activities 451. For example, a look-up table 459 may be accessed by the time tracking application 107 to determine if detected user application activities 103 have corresponding predefined client billable activities 451.

At 703, time tracking entries may be automatically opened and stored for user application activities 103 with a corresponding client billable activity 451.

At 705, an activity identifier 325 for the user application activity 103 and/or its associated client billable activity 451 may be stored in the opened time tracking entry. For example, a text identifier or numerical identifier may be stored to indicate a user application activity 103 and/or its associated client billable activity 451.

At 707, a duration of the user application activity 103 may be determined and stored in the time tracking entry as a time indicator 329 associated with the corresponding activity identifier. At 709, a user ID may be stored in the time tracking entry. At 711, a client ID 353 may be stored in the time tracking entry. In some embodiments, the user ID 351 and/or client ID 353 may be textual or numerical. Other user IDs 351 and client IDs 353 are also possible. At 713, a billing code 349 may be stored in the time tracking entry. Other information may also be stored. For example, the system user 101 may be presented with a text window to enter notes and/or descriptions for a time tracking entry.

Figure 8:
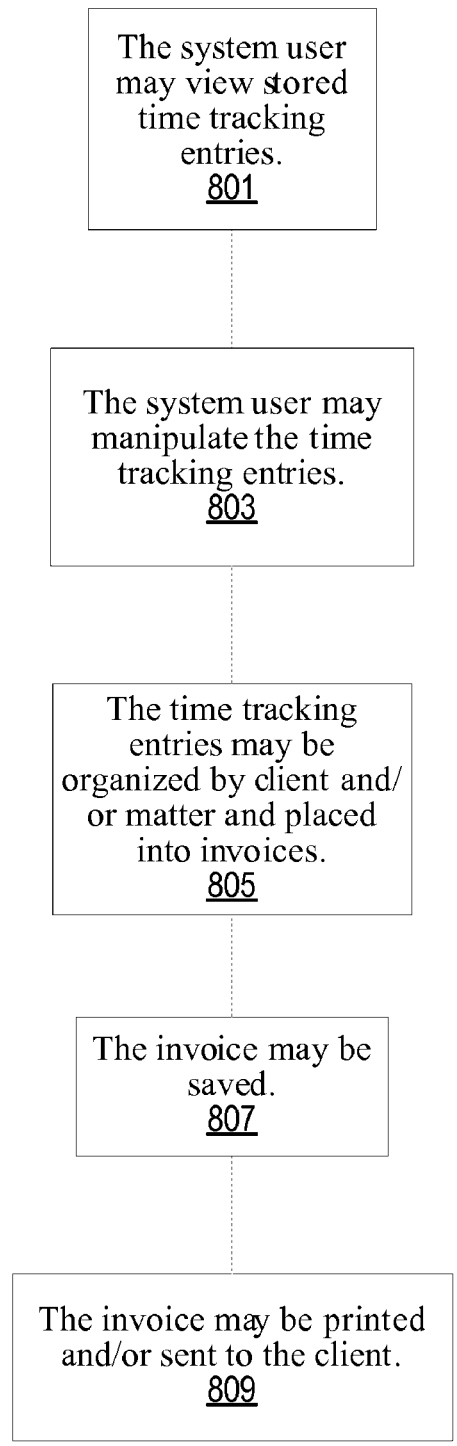
FIG. 8 illustrates a method for processing invoices, according to an embodiment.
Figure 9C:
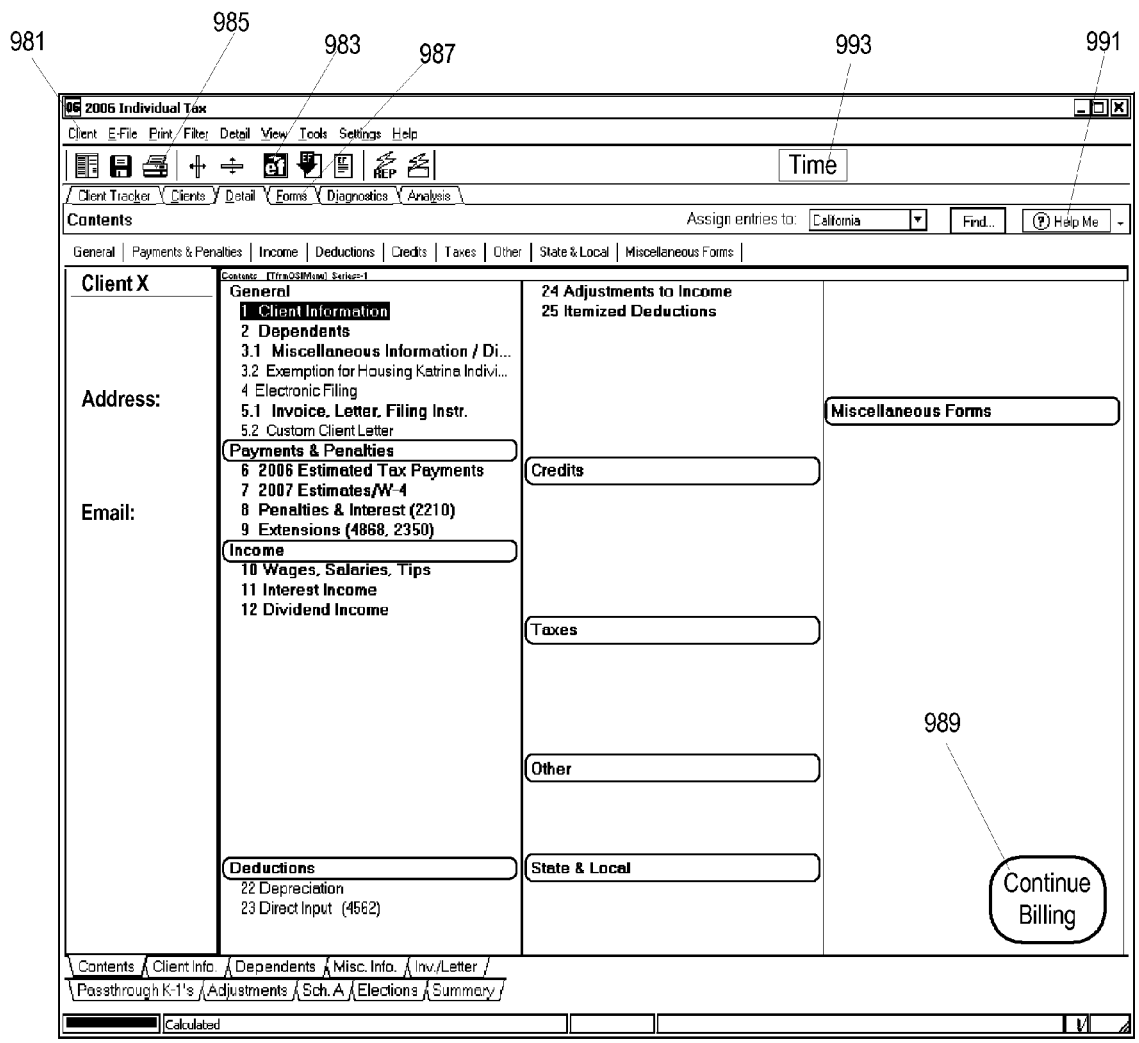

FIG. 8 illustrates a method for processing invoices, according to an embodiment. It should be noted that in various embodiments of the methods described below, one or more of the elements described may be performed concurrently, in a different order than shown, or may be omitted entirely. Other additional elements may also be performed as desired. In some embodiments, the method may be performed automatically (e.g., by a computer system).

At 801, the system user 101 may view stored time tracking entries. The time tracking application 107 may display the time tracking entries to the system user 101 (e.g., on a system display). In some embodiments, the time tracking application 107 may store the data in a format accessible to another application used for forming client invoices (e.g., in a spreadsheet or rich text format).

At 803, the system user 101 may manipulate the time tracking entries. The system user 101 may add or delete time to the time tracking entries to fix discrepancies or account for time not accounted for by the time tracking application 107. For example, the system user 101 may have been working on a tax return for 30 minutes away from the keyboard (e.g., on a client call) and the time tracking application 107 may have stored a 30 minute inactivity period. The system user 101 may adjust the time indicator 329 for the corresponding client billable activity 451 to account for the extra 30 minutes. Other changes to time tracking entries are also possible.

At 805, the time tracking entries may be organized by client 353 and/or matter and placed into invoices. For example, the time tracking entries for a single client may be gathered together on one invoice. Related entries may be grouped together as well (e.g., all entries for a particular tax return may be gathered together. Entries may also be grouped by type (e.g., all of the "Print File" entries may be gathered together). Billing codes 349 may also be used in grouping the time tracking entries.

At 807, the invoice may be saved. In some embodiments, the invoice may be saved on a local and/or external storage device.

At 809, the invoice may be printed and/or sent to the client 353. In some embodiments, an electronic copy of the invoice may be sent to the client 353 (e.g., in an email).

FIGS. 9*a-e* illustrate an embodiment of the time tracking application being used to collect data for a client invoice. In one embodiment, the system user 101 may be a tax accountant. The tax accountant may provide look-up table 959 with associations between various client billable activities 451, user application activities 103, companion user application activities 455, and billing codes 349. For example, the tax accountant may provide a file address to the look-up table 959 stored on an external storage device. The tax accountant may also provide the time tracking application 107 with a threshold value of 15 minutes for inactivity calculations.

As the tax accountant starts using the user application 109 (e.g., a "tax application" to prepare tax returns), the time tracking application 107 may intercept messages 111 between the operating system 105 and the tax application to detect user application activities 103. In this example, the tax account may open a file by selecting "Open File" from a drop down menu under "Client" 981 (see screenshot in FIG. 9*c*). Upon selecting "Open File", the operating system 105 may send a message 111 to the tax application regarding the selection. The message 111 may be intercepted and read by the time tracking application 107 before being sent on to the tax application. The time tracking application 107 may determine from the message 111 that the user application activity 103 of "Open File" occurred.

Referring to the look-up table 959, the time tracking application 107 may determine that "Open File" has a corresponding client billable activity 451 of "Review File". The time tracking application 107 may then determine, based on the look-up table 959, that the "Open File" user application activity 103 has a companion user application activity 455 of "Close File". The time tracking application 107 may continue intercepting messages 111 from the operating system 105 until the user application activity 103 of "Close File" (e.g., the tax accountant selecting "Close File" from a drop down menu under "Client" or a termination of the tax application that subsequently closes the file) is detected. The time tracking application 107 may store a time indicator 329 that indicates a start time for the "Review File" activity (e.g., the time when the "Open File" activity message 111 was read by the time tracking application 107). When the time tracking application 107 intercepts a message 111 indicating a "Close File" activity, the time tracking application 107 may determine a total time the tax accountant spent reviewing the file (e.g., the duration of time between the "Open File" message 111 and the "Close File" message 111). The time tracking application 107 may store the duration as a time indicator 941 in a time tracking entry 901 with an activity identifier 943.

The duration of time may be modified to account for periods of inactivity by the tax accountant. For example, if the tax accountant left the room (as evidenced by discontinuing use of the peripheral devices attached to the computer system), the time tracking application 107 may determine a total time of inactivity to subtract from the duration stored for "Review File". If the tax accountant left the room for 40 minutes, the time tracking application 107 may start timing the inactivity after the predetermined 15 minute threshold has lapsed (resulting in 25 minutes of accounted for inactivity time). This inactivity time may then be subtracted from the current ongoing user application activity's (e.g., "Review File") time indicator 329. Instead of leaving the room, if the tax accountant was still at his desk but was examining documents instead of using computer peripheral devices for 40 minutes, the tax accountant could click the "Continue Billing" icon 989 to indicate to the time tracking application 107 it should not count the time from the click of the icon 989 until the next detectable user application activity 103 as inactive time. For example, if the tax accountant clicked the icon 989 after 20 minutes of inactivity, the time tracking application 107 may subtract 5 minutes of inactivity from the duration for reviewing the file (20 minutes–15 minute predetermined threshold=5 minutes). The time tracking application 107 may not consider the 25 minutes of no peripheral feedback to be inactivity because the icon 989 was clicked. The time tracking application 107 may also assign a threshold of time to clicking the icon 989. For example, the time tracking application 107 may wait 30 minutes after the icon 989 is clicked to once again start accounting for inactivity. The 30 minute threshold may be user defined. For example, this threshold and other parameters may be accessed/changed through a user interface displayed to the system user 101, for example, when the system user 101 clicks on the "Time" icon 993. Other ways of accessing the user interface for the time tracking application 107 are also contemplated.

The time tracking application 107 may intercept a message 111 that indicates the tax accountant has accessed a data panel for data entry. For example, if the tax accountant selects "Forms" tab 987, the time tracking application 107 may store a time tracking entry 903 for "Data Entry". The time tracking application 107 may determine a total time spent on "Data Entry" by determining how much time passes between selecting the "Forms" tab 987 and selecting "Close Panel" (minus any inactivity time). A time indicator 945 may be stored with a corresponding activity identifier 947 (e.g., "Data Entry") in time tracking entry 903. If the "Data Entry" took place during "Review File" (i.e., before the time tracking application 107 intercepted a message 111 indicating "Close File"), the time tracking application 107 may subtract the total time for "Data Entry" from the time stored for "Review File" (e.g., to prevent double billing time to Client X).

Additional time tracking entries may be stored for "Research Tax Laws" (time tracking entry 905), "Print Tax Return" (time tracking entry 909), and "Efile Return" (time tracking entry 911). Periods of inactivity may also be stored as a separate time tracking entry (e.g., time tracking entry 907). Corresponding user application activities 103 may include selecting "Help Me" icon 991, selecting printer icon 985, and selecting "Efile" icon 983. As indicated in look-up table 959, there may be multiple user application activities (e.g., "Select 'Print File' icon or 'Print File' from Print menu" 963) assigned to a client billable activity (e.g., "Print Tax Return" 961). FIG. 9b also illustrates various types of time indicators.

As seen in FIG. 9d, the tax accountant may make changes to the time tracking entries displayed in FIG. 9b. For example, the tax accountant (or the time tracking application) may standardize the time indicators. In some embodiments, the time indicators may be stored in a standardized format by the time tracking application 107 and may not need to be standardized. The tax accountant may also adjust the time indicators to compensate for inaccuracies not detected by the time tracking application. For example, the tax accountant may have been analyzing a paper file and inadvertently did not click on the "Continue Billing" icon 989. The tax accountant may therefore add time to the corresponding time indicator to compensate for incorrectly subtracted inactivity time. The tax accountant may also subtract time from a time indicator as needed. As seen in FIG. 9e, the time tracking entries may be organized into an invoice 999. Additional data (e.g., billing rates) may be collected, for example, from an external storage device. Other sources of data are also contemplated (e.g., the tax accountant may enter their billing rate). Different billing codes may be linked to different billing rates.

Figure 10:
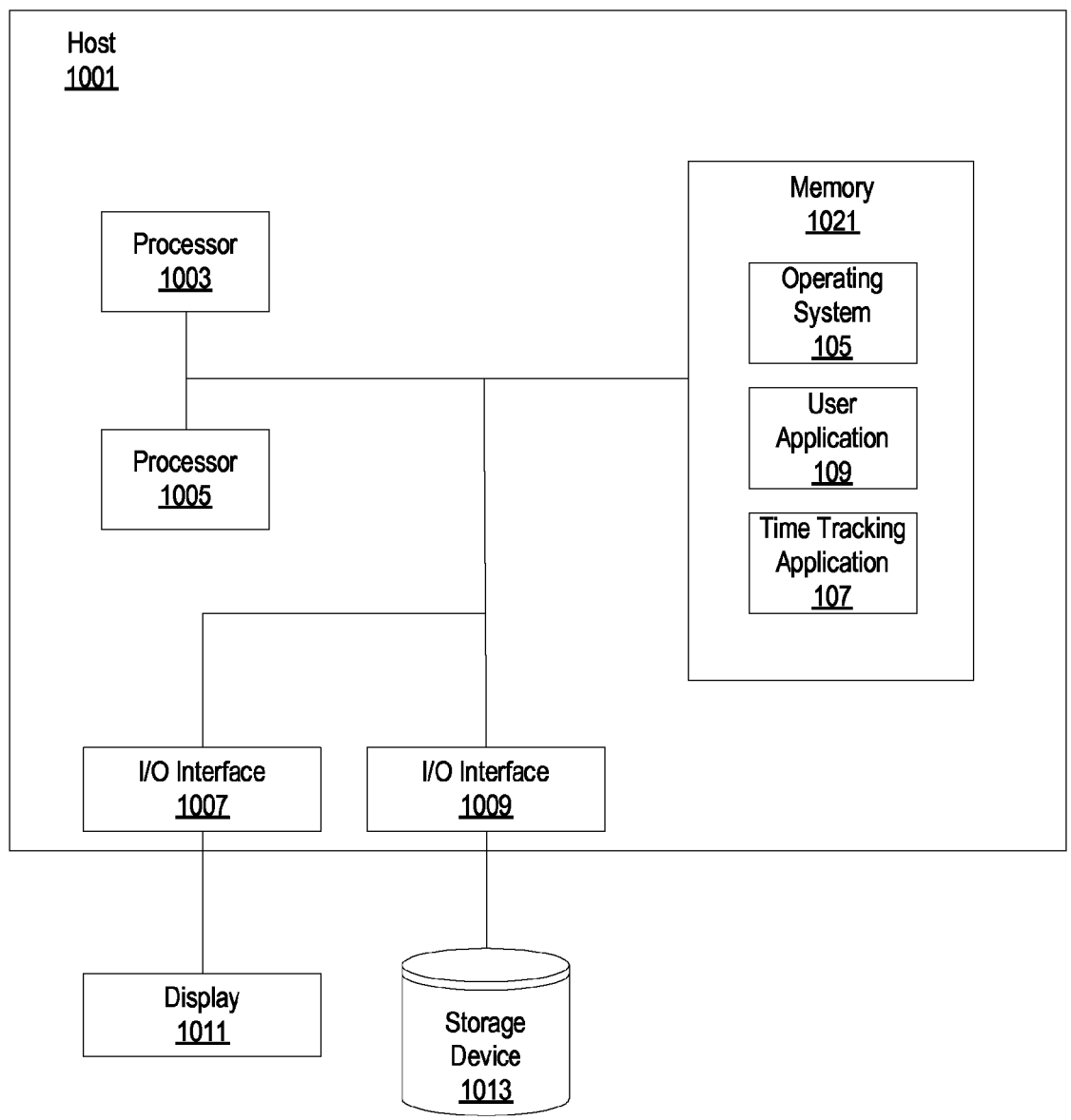
FIG. 10 illustrates a host system, according to an embodiment.

FIG. 10 illustrates a host system 1001, according to an embodiment. Embodiments of a subset or all (and portions or all) of the above may be implemented by program instructions stored in a memory medium (e.g., memory 1021) or carrier medium and executed by a processor (e.g., processors 1003 and 1005). A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. Program instructions stored on the memory medium may be accessed to execute the operating system 105, user application 109, and/or time tracking application 107. The host system 1001 may access display 1011 through Input/Output (I/O) interface 1007 and may access external storage devices (e.g., storage device 1013) through I/O interface 1009. For example, the host system 1001 may store time tracking entries and/or invoices on external device 1013.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for automatically tracking time for client billable activities, comprising:
    determining, based on a user input, a first association between a first billable activity and a first user application activity,
        wherein the first association is stored in a look up table, and
        wherein the first user application activity corresponds to an initiation of the first billable activity;
    determining, based on the user input, a second association between the first billable activity and a companion user application activity associated with the first user application,
        wherein the second association is stored in the look up table, and
        wherein the companion user application activity corresponds to a conclusion of the first billable activity;
    determining, based on the user input, a third association between a second billable activity and a second user application activity,
        wherein the third association is stored in the look up table,
        wherein the second user application activity is associated with a duration of the second billable activity, and
        wherein the first user application activity, the companion user application activity, and the second user application activity are associated with a user application executing on a user computer;
    detecting, at the user computer, the first user application activity;
    identifying the first billable activity, by using the lookup table, based on the first user application activity;
    generating a first time tracking entry associated with the first billable activity, wherein the first time tracking entry comprises a first activity identifier and a first time indicator indicating the initiation of the first billable activity; and
    automatically storing the first time tracking entry;
    detecting, at the user computer and subsequent to detecting the first user application activity, the second user application activity;
    generating a second time tracking entry comprising a second activity identifier and a second time indicator indicating the duration of the second billable activity;
    storing the second time tracking entry automatically;
    detecting, at the user computer and subsequent to detecting the second user application activity, the companion user application activity;
    generating a third time tracking entry comprising a third activity identifier and a third time indicator indicating the conclusion of the first billable activity;
    storing the third time tracking entry automatically; and
    facilitating preparation of a bill for a client,
        wherein the bill is based on:
            the first, second, and third time indicators, and
            the first, second, and third activity identifiers, and
        wherein the bill comprises:
            a first billable time period based on the duration, and
            a second billable time period based on subtracting the duration from a time period between the first and second time indicators.

2. The method of claim 1,
    wherein the first time tracking entry further comprises a client identifier that corresponds to a client identity,
    wherein the bill is further based on a billing code associated with the first activity identifier, and
    wherein the billing code is accessed from a file on which the user is working and stored in the first time tracking entry.

3. The method of claim 2, wherein the client identity is indicated by a user through a user interface.

4. The method of claim 1,
    wherein detecting the first user application activity comprises detecting a voice command from the user, and
    wherein detecting the second user application activity comprises determining the duration associated with the second user application activity.

5. The method of claim 1, wherein detecting the first user application activity comprises a time tracking application intercepting a message from an operating system to the user application.

6. The method of claim 1,
    wherein the application program is a tax return preparation application,.
    wherein the first user application activity comprises activating a file open command within the tax return preparation application, the companion user application activity comprises activating a file close command within the tax return preparation application, and the second user application activity comprises completing a tax form within the tax return preparation application, and
    wherein the first billable activity comprises review file activity and the second billable activity comprises data entry activity.

7. The method of claim 1, wherein the first user application activity is selected from a group consisting of selecting a menu option using a mouse cursor and clicking an icon on using a mouse cursor.

8. The method of claim 1, wherein the first user application activity corresponds to at least one selected from a group consisting of opening a file, closing a file, inputting data into a data panel, and printing a file.

9. The method of claim 1, further comprising automatically storing an indication of user inactivity after a predetermined amount of time of detected user inactivity, wherein the indication of user inactivity includes a time indicator for the detected user inactivity.

10. The method of claim 9, wherein storing an indication of user inactivity comprises disregarding detected user inactivity that a user has indicated should be disregarded.

11. A system, comprising:
a processor;
a memory coupled to the processor and configured to store program instructions executable by the processor to:
determine, based on a user input, a first association between a first billable activity and a first user application activity,
wherein the first association is stored in a look up table, and
wherein the first user application activity corresponds to a beginning of the first billable activity;
determine, based on the user input, a second association between the first billable activity and a companion user application activity associated with the first user application,
wherein the second association is stored in the look up table, and
wherein the companion user application activity corresponds to an ending of the first billable activity;
determine, based on the user input, a third association between a second billable activity and a second user application activity,
wherein the third association is stored in the look up table,
wherein the second user application activity is associated with a duration of the second billable activity, and
wherein the first user application activity, the companion user application activity, and the second user application activity are associated with a user application executing on a user computer;
detect, at the user computer, the first user application activity;
identify the first billable activity, by using the lookup table, based on the first user application activity;
generate a first time tracking entry associated with the first billable activity, wherein the first time tracking entry comprises a first activity identifier and a first time indicator indicating the beginning of the first billable activity; and
store the first time tracking entry automatically;
detect, at the user computer and subsequent to detecting the first user application activity, the second user application activity;
generate a second time tracking entry comprising a second activity identifier and a second time indicator indicating the duration of the second billable activity;
store the second time tracking entry automatically;
detect, at the user computer and subsequent to detecting the second user application activity, the companion user application activity;
generate a third time tracking entry comprising a third activity identifier and a third time indicator indicating the ending of the first billable activity;
store the third time tracking entry automatically; and
facilitate preparation of a bill for a client,
wherein the bill is based on:
the first, second, and third time indicators, and
the first, second, and third activity identifiers,
wherein the bill comprises:
a first billable time period based on the duration, and
a second billable time period based on subtracting the duration from a time period between the first and second time indicators.

12. The system of claim 11,
wherein the first time tracking entry further comprises a client identifier that corresponds to a client identity,
wherein the bill is further based on a billing code associated with the first activity identifier, and
wherein the billing code is accessed from a file on which the user is working and stored in the first time tracking entry.

13. The system of claim 12, wherein the client identity is indicated by a user through a user interface.

14. The system of claim 11,
wherein detecting the first user application activity comprises detecting a voice command from the user, and
wherein detecting the another second user application activity comprises determining the duration associated with the second user application activity.

15. The system of claim 11, wherein detecting the first user application activity comprises a time tracking application intercepting a message from an operating system to the user application.

16. The system of claim 11,
wherein the application program is a tax return preparation application,.
wherein the first user application activity comprises activating a file open command within the tax return preparation application, the companion user application activity comprises activating a file close command within the tax return preparation completing a tax form within the tax return preparation application, and
wherein the first billable activity comprises review file activity and the second billable activity comprises data entry activity.

17. The system of claim 11, wherein the first user application activity is selected from a group consisting of selecting a menu option using a mouse cursor and clicking an icon using a mouse cursor.

18. The system of claim 11, wherein the first user application activity corresponds to at least one selected from a group consisting of opening a file, closing a file, inputting data into a data panel, and printing a file.

19. The system of claim 11, wherein the program instructions are further executable to automatically store an indication of user inactivity after a predetermined amount of time of detected user inactivity, wherein the indication of user inactivity includes a time indicator for the detected user inactivity.

20. The system of claim 19, wherein storing an indication of user inactivity comprises disregarding detected user inactivity that a user has indicated should be disregarded.

21. A computer-readable storage medium, comprising program instructions, wherein the program instructions are computer-executable to:
determine, based on a user input, a first association between a first billable activity and a first user application activity,
wherein the first association is stored in a look up table, and
wherein the first user application activity corresponds to a beginning of the first billable activity;

determine, based on the user input, a second association between the first billable activity and a companion user application activity associated with the first user application,
  wherein the second association is stored in the look up table, and
  wherein the companion user application activity corresponds to an ending of the first billable activity;
determine, based on the user input, a third association between a second billable activity and a second user application activity,
  wherein the third association is stored in the look up table,
  wherein the second user application activity is associated with a duration of the second billable activity, and
  wherein the first user application activity, the companion user application activity, and the second user application activity are associated with a user application executing on a user computer;
detect, at the user computer, the first user application activity;
identify the first billable activity, by using the lookup table, based on the first user application activity;
generate a first time tracking entry associated with the first billable activity, wherein the first time tracking entry comprises a first activity identifier and a first time indicator indicating the beginning of the first billable activity; and
store the first time tracking entry automatically;
detect, at the user computer and subsequent to detecting the first user application activity, the second user application activity;
generate a second time tracking entry comprising a second activity identifier and a second time indicator indicating the duration of the second billable activity;
store the second time tracking entry automatically;
detect, at the user computer and subsequent to detecting the second user application activity, the companion user application activity;
generate a third time tracking entry comprising a third activity identifier and a third time indicator indicating the ending of the first billable activity;
store the third time tracking entry automatically; and
facilitate preparation of a bill for a client,
  wherein the bill is based on:
    the first, second, and third time indicators, and
    the first, second, and third activity identifiers, and
  wherein the bill comprises:
    a first billable time period based on the duration, and
    a second billable time period based on subtracting the duration from a time period between the first and second time indicators.

22. The computer readable medium of claim 21,
  wherein detecting the first user application activity comprises detecting a voice command from the user, and
  wherein detecting the second user application activity comprises determining the duration associated with the second user application activity.

23. The computer readable medium of claim 21, wherein detecting the first user application activity comprises a time tracking application intercepting a message from an operating computer readable medium to the user application.

24. The computer readable medium of claim 21,
  wherein the application program is a tax return preparation application,.
  wherein the first user application activity comprises activating a file open command within the tax return preparation application, the companion user application activity comprises activating a file close command within the tax return preparation application, and the second user application activity comprises completing a tax form within the tax return preparation application, and
  wherein the first billable activity comprises review file activity and the second billable activity comprises data entry activity.

25. The computer readable medium of claim 21, wherein the program instructions are further executable to automatically store an indication of user inactivity after a predetermined amount of time of detected user inactivity, wherein the indication of user inactivity includes a time indicator for the detected user inactivity.

26. The computer readable medium of claim 25, wherein storing an indication of user inactivity comprises disregarding detected user inactivity that a user has indicated should be disregarded.

27. The computer readable medium of claim 21,
  wherein the first time tracking entry further comprises a client identifier that corresponds to a client identity,
  wherein the bill is further based on a billing code associated with the first activity identifier, and
  wherein the billing code is accessed from a file on which the user is working and stored in the first time tracking entry.

28. The computer readable medium of claim 27, wherein the client identity is indicated by a user through a user interface.

* * * * *

UNITED STATES PATENT AND TRADEMARK OFFICE
CERTIFICATE OF CORRECTION

PATENT NO.         : 7,881,990 B2                                      Page 1 of 1
APPLICATION NO.    : 11/565367
DATED              : February 1, 2011
INVENTOR(S)        : James A. Slattery It is certified that error appears in the above-identified patent and that said Letters Patent is hereby corrected as shown below:

In Claim 14, Column 18 (line 21), "another" should be deleted.

In Claim 16, Column 18 (line 31), the "." should be deleted.

In Claim 16, Column 18 (line 36), after "preparation" please add --application, and the second user application activity comprises--.

In Claim 24, Column 20 (line 18), the "." should be deleted.

Signed and Sealed this
Fifth Day of April, 2011

David J. Kappos
*Director of the United States Patent and Trademark Office*